United States Patent
Krochmal et al.

(10) Patent No.: US 11,792,242 B2
(45) Date of Patent: Oct. 17, 2023

(54) SHARING ROUTINE FOR SUGGESTING APPLICATIONS TO SHARE CONTENT FROM HOST APPLICATION

(71) Applicant: Apple Inc., Cupertino, CA (US)

(72) Inventors: Marc J. Krochmal, Santa Clara, CA (US); John J. Iarocci, Los Gatos, CA (US); Joseph E. Meyer, Bethesda, MD (US); Chiraag Sumanth, Mountain View, CA (US); Joao Pedro Lacerda, Santa Cruz, CA (US); Jacob Klapper, San Jose, CA (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 16/573,930

(22) Filed: Sep. 17, 2019

(65) Prior Publication Data

US 2020/0382568 A1     Dec. 3, 2020

Related U.S. Application Data

(60) Provisional application No. 62/856,031, filed on Jun. 1, 2019.

(51) Int. Cl.
  *G06F 15/16*   (2006.01)
  *G06F 9/54*    (2006.01)
  (Continued)

(52) U.S. Cl.
  CPC ........ *H04L 65/4025* (2022.05); *H04L 67/104* (2013.01); *H04L 67/131* (2022.05);
  (Continued)

(58) Field of Classification Search
  CPC ............ H04L 65/4023; H04L 65/4025; H04L 67/131; H04L 67/75; H04L 67/561; H04L 67/104; H04L 67/141; G06F 8/36
  (Continued)

(56) References Cited

U.S. PATENT DOCUMENTS 9,116,596 B2   8/2015   Roman et al.
9,183,515 B2   11/2015  Gundotra et al.
(Continued)

FOREIGN PATENT DOCUMENTS

CN    105550933 A    5/2016
WO    2015183456 A1  12/2015

OTHER PUBLICATIONS

Kim et al., "HIGH5: Promoting Interpersonal Hand-to-Hand Touch for Vibrant Workplace With Electrodermal Sensor Watches." *UbiComp* '14, Sep. 13-14, 2014, Seattle, WA, USA. ACM 978-1-4503-2968-2/14/09. 5 pages.
(Continued)

*Primary Examiner* — Hamza N Algibhah
(74) *Attorney, Agent, or Firm* — KILPATRICK TOWNSEND & STOCKTON LLP

(57) ABSTRACT

Content objects may be selected for sharing and shared across devices using a sharing routine and suggestion engine to provide suggestions of target applications to share the content objects and recipients with whom the content objects may be shared. A sharing routine may receive and analyze a sharing request and invoke a suggestion engine configured to generate application suggestions and/or recipient suggestions. The sharing routine may receive sets of application suggestions and/or recipient suggestions from a suggestion engine, modify and/or select subsets of the suggestions to be provided to user via a sharing user interface. In response to a user selection of applications and/or recipient via the user interface, the sharing routine may invoke the selected application for sharing, and provide the content object to the selected application.

20 Claims, 8 Drawing Sheets

(51) Int. Cl.
  *H04L 29/06* (2006.01)
  *H04L 65/402* (2022.01)
  *H04L 67/104* (2022.01)
  *H04L 67/141* (2022.01)
  *H04L 67/75* (2022.01)
  *H04L 67/131* (2022.01)
  *H04L 67/561* (2022.01)

(52) U.S. Cl.
  CPC .......... *H04L 67/141* (2013.01); *H04L 67/561* (2022.05); *H04L 67/75* (2022.05)

(58) Field of Classification Search
  USPC ........................................................ 709/227
  See application file for complete search history.

(56) References Cited

U.S. PATENT DOCUMENTS

| | | |
|---|---|---|
| 9,563,488 B2 | 2/2017 | Fadel et al. |
| 10,356,020 B2 | 7/2019 | Chao et al. |
| 2015/0081783 A1* | 3/2015 | Gong ..................... H04L 65/60 709/204 |
| 2015/0347200 A1* | 12/2015 | Fadel ....................... G06F 9/54 719/319 |
| 2017/0068906 A1 | 3/2017 | Korycki et al. |
| 2017/0093774 A1* | 3/2017 | Arastafar ............ H04L 65/1069 |
| 2017/0235848 A1 | 8/2017 | Van Dusen et al. |
| 2017/0250940 A1* | 8/2017 | Chao ....................... H04L 67/22 |
| 2018/0032997 A1 | 2/2018 | Gordon et al. |
| 2018/0052587 A1* | 2/2018 | LaPier ................... G06F 3/0482 |
| 2018/0349659 A1 | 12/2018 | Manzari et al. |
| 2018/0367484 A1* | 12/2018 | Rodriguez .............. H04L 67/36 |
| 2018/0373415 A1* | 12/2018 | Dellinger ............. G06F 3/04842 |
| 2019/0102396 A1* | 4/2019 | Pan ................... G06F 16/24578 |
| 2019/0138951 A1 | 5/2019 | Brownhill et al. |
| 2019/0139150 A1* | 5/2019 | Brownhill .............. G06Q 50/01 |
| 2019/0347181 A1* | 11/2019 | Cranfill ................. G06F 21/629 |

OTHER PUBLICATIONS

Srinivasan, Vijay et al., "Mobileminer; Mining Your Frequent Patterns on Your Phone." Ubicomp, Sep. 13-17 2014, Seattle, Washington. 12 pages.

Non-Final Office Action issued in U.S. Appl. No. 16/835,075, dated May 17, 2022, in 21 pages.

* cited by examiner

SHARING ROUTINE FOR SUGGESTING APPLICATIONS TO SHARE CONTENT FROM HOST APPLICATION

CROSS-REFERENCES TO RELATED APPLICATIONS

The present application is a non-provisional of and claims the benefit of and priority to U.S. Provisional Application No. 62/856,031, filed Jun. 1, 2019, and entitled, "SHARING ROUTINE FOR SUGGESTING APPLICATIONS TO SHARE CONTENT FROM HOST APPLICATION," entire contents of which is incorporated herein by reference for all purposes.

BACKGROUND

Modern computing devices and communication networks provide users with greater functionality and flexibility than ever before for consuming, interacting with, and sharing digital content. For example, a mobile computing device (e.g., smartphone, tablet, etc.) may have installed thereon dozens or even hundreds of applications, each of which may be specialized to support a specific set of interactions with particular types of content objects. While certain applications may be designed for viewing/editing of images and videos, various other applications may be designed for interacting with documents, structured or unstructured data, web-based content, social media data, and so on. A number of specialized applications also may interact with their own proprietary types of content objects, which may or may not be compatible with other applications.

Further, a single mobile device or other computing device may include multiple communication applications designed to support different communication session types and/or capabilities with other devices. For instance, within a mobile device, a telephone application may provide the capabilities of placing phone calls and sending SMS text messages, email applications may support email communication, various types of messaging applications may support instant messaging, video calls and video conferences, and various other applications may support application-based interactions or communication sessions.

Although the increasing numbers of applications, content types, and communication techniques have provided users with a greater number of possibilities for interacting with and sharing digital content, these increases also may create difficulties and inefficiencies when identifying compatible applications for sharable content objects, and for determine particular applications to be used and recipients to be selected for sharing digital content.

BRIEF SUMMARY

Techniques are described herein for sharing content objects across devices, including using a sharing routine and suggestion engine to provide suggestions of target applications to be used to share content objects and recipients with whom the content objects may be shared. In some embodiments, a sharing routine executing on a computing device may receive a request from a host application to share a particular content object. In response to the request, the sharing routine may determine and output suggestions for an application to be used for sharing the content object, and/or for recipients to whom the content object is to be shared. Application and recipient suggestions may be generated by the sharing routine alone, and/or in conjunction with a suggestion engine. In various embodiments, the suggestions may be determined based on analyses of the content object type, the host application from which the share request was received, different applications installed on the computing device, current context data, as well as various additional data sources.

The sharing routine may initially determine the type of the content object to be shared via the host application, along with a host application identifier and/or characteristics of the host application current executing on the device. The sharing routine also may determine which applications installed on the device support with the type of the content object to be shared. The sharing routine and/or suggestion engine may be configured to determine application suggestions and/or recipient suggestions based on the user, the host application, the device, and well as current contextual data and other factors. For example, the sharing routine may initially analyze the sharing request, content object type, host application, current context data, etc., and then may invoke the suggestion engine and provide the relevant sharing request data to allow the suggestion engine to generate application suggestions and/or recipient suggestions. In some cases, the sharing routine invoke the suggestion engine to execute one or more trained machine-learning models, or other complex and data-driven analyses techniques, based on the content object type, host application, previous user interaction data, current context data, etc. The sharing routine then may receive sets of application suggestions and/or recipient suggestions from a suggestion engine, customize and/or filter the received suggestions, and then select subsets of the suggestions to be provided to user via a sharing user interface. In response to a user selection of an application to be used for sharing, the sharing routine may invoke the selected application and provide the content object to the selected application. In some embodiments, certain fields or features of the invoked application also may be prepopulated based on the sharing request, a selected recipient, the user, the host application, and the like, thereby facilitating more efficient sharing functionality.

These and other embodiments of the disclosure are described in detail below. For example, other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
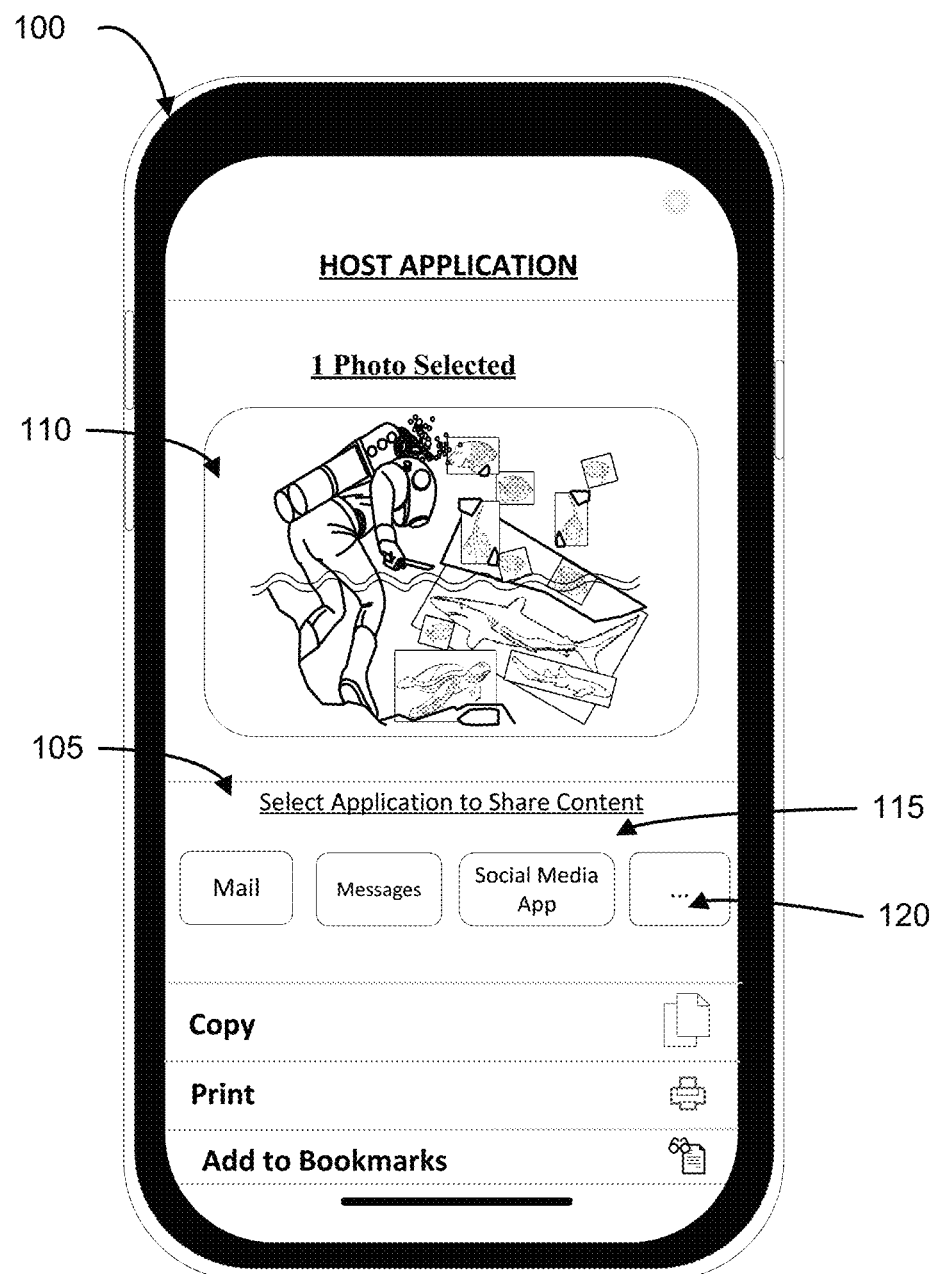
FIG. 1 shows an example user interface of an example mobile device illustrating a process for selecting an application to share content that may be improved be embodiments of the present disclosure.

Aspects of the present disclosure provide various techniques (e.g., methods, systems, devices, computer-readable media storing computer-executable instructions used to perform computing functions, etc.) for sharing content objects across applications within a device, and across devices to specified recipients via specified applications.

In some embodiments, a sharing routine executing on a computing device may receive a request from a host application to share a particular content object. In response to the request, the sharing routine may determine and output suggestions for an application to be used for sharing the content object, and/or for recipients to whom the content object is to be shared. Application and recipient suggestions may be performed by the sharing routine alone, or in conjunction with a suggestion engine. In various embodiments, the suggestions may be determined based on analyses of the content object, the host application from which the share request was received, and the different applications installed on the computing device, along with additional data sources and techniques discussed below.

For example, the sharing routine may initially determine the type of the content object to be shared via the host application, along with a host application identifier and/or characteristics of the host application current executing on the device. The sharing routine may determine which applications installed on the device are compatible with the type of the content object to be shared. In various embodiments, the sharing routine may be configured to determine application suggestions and/or recipient suggestions based on the user, the host application, the device, and well as current contextual data and/or previous instances of sharing initiated by the sharing routine, etc. Additionally or alternatively, the sharing routine may invoke a suggestion engine to execute a more complex and data-driven analysis to determine suggestions for applications and/or recipients for sharing the content object via the sharing routine. Thus, in some cases, the sharing routine may receive sets of application suggestions and/or recipient suggestions from a suggestion engine, and may then select subsets of the suggestions for displaying via a user interface.

A suggestion engine may be implemented to execute one or more data-driven algorithms to determine suggestions for applications and/or recipients for sharing the content objects via the sharing routine. In some embodiments, a suggestion engine may access and execute a machine-learning model trained based on previous (or historical) user interactions with the various applications installed on the device. Such interactions may include previous instances of sharing various content types using different applications, current and recent application usage, and current contextual data of the device (e.g., time, location, current application usage and status), as well as various additional data sources.

After determination of one or more application suggestions and/or recipient suggestions for sharing the content object, the sharing routine may provide a user interface displaying the suggested applications and/or recipients as selectable components. In response to a user selection of an application to be used for sharing, the sharing routine may invoke the selected application and provide the content object to the selected application. In some embodiments, certain fields or features of the invoked application also may be prepopulated based on the sharing request, a selected recipient, the user, the host application, and the like, thereby facilitating more efficient sharing functionality.

I. Sharing Content Objects from Host Applications Via Sharing Routine

In some embodiments, a communication interaction may involve sharing a content object from a host application, e.g., a photo application, web browser, social media application, etc. A user interface associated with the host can allow a user to indicate that content should be shared. Examples of such content include photos, files, URLs, a deep link for a website (e.g., a hypertext link to a page on a Web site other than its home page), or a deep link to an application (e.g., a link to a page/window other than an app splash screen).

FIG. 1 shows an example user interface of an example mobile device 100 illustrating a process for selecting an application to share content that may be improved by embodiments of the present disclosure. As depicted, a user has selected a photo 110 for sharing. As examples, the photo may have been selected in a photo app or a camera app (e.g., after taking a photo an icon can be displayed for selecting the photo). The photo or camera app can be considered a host app. Some embodiments can use the identity of the host app (e.g., via a host identifier) to make improvements, as will be described later.

After the photo is selected, the user can provide a user request to share the photo. Such a user request can be provided in various forms of user input, e.g., selecting a button or other selection object on a screen or via a voice command. For instance, a share button can be provided on a screen that is shows the content to be shared. As an example, such a screen may show a website, where the content to be shared is a URL for the website. In some embodiments, the selection of the content object can also act as the user request to share the content object.

After receiving the user request to share the content object, a sharing routine can be invoked. The sharing routine can include a user interface 105 for selecting actions to be performed with photo 110. For instance, a list 115 of applications can be provided, e.g., for the user to communicate the content object (photo 110 in this instance). This list 115 of applications can be a default list, e.g., as configured by the user or by the manufacturer of the operating system of the device. The list 115 can be generated without regard to what host application was used to select the content object or to whether any of the applications in list 115 actually can be used to communicate photo 110, which can cause errors or user frustration. Some embodiments of the present disclosure can address such issues.

Further, the list 115 of applications may not be the application that the user wants to use. Thus, a user may need to scroll the list (e.g., if the list includes more app icons than can fit on the screen) or select a more button 120, which can provide a list of applications for the user to browse. The need for such additional actions by a user can frustrate a user.

Additionally, after the desired application is selected, the user would still need to provide the recipient to which the content object is to be shared. The user may have to scroll through a contact list or have to remember the specific name under which the desired recipient is stored. For instance, the user may want to send the content object to 'John,' but the user may have multiple contacts with that name. Again, such extra actions required of the user can cause frustration.

To address such problems, some embodiments can identify applications that a user is mostly likely going to use, and then provide an ordered list of those applications. In this manner, the sharing routine is more likely to display the desired application on the initial screen, e.g., in one of the first three slots, as is displayed in FIG. 1. Further, some embodiments can recommend a particular recipient, potentially in combination with a particular application

II. Example System with Sharing Support Components

In some embodiments, the software architecture for enabling efficient sharing of a content objet can include a sharing routine and a suggestion engine. These software modules can work together to provide a user interface that provides an ordered list of communication applications and/or potentially application/recipient combinations for sharing a particular content object that has been selected using a host application. Either or both of these software modules can use gather context data (e.g., location, host identifier, time of day, etc.) so that the suggestion engine can determine the ordered list for the sharing routine to display.

Figure 2:
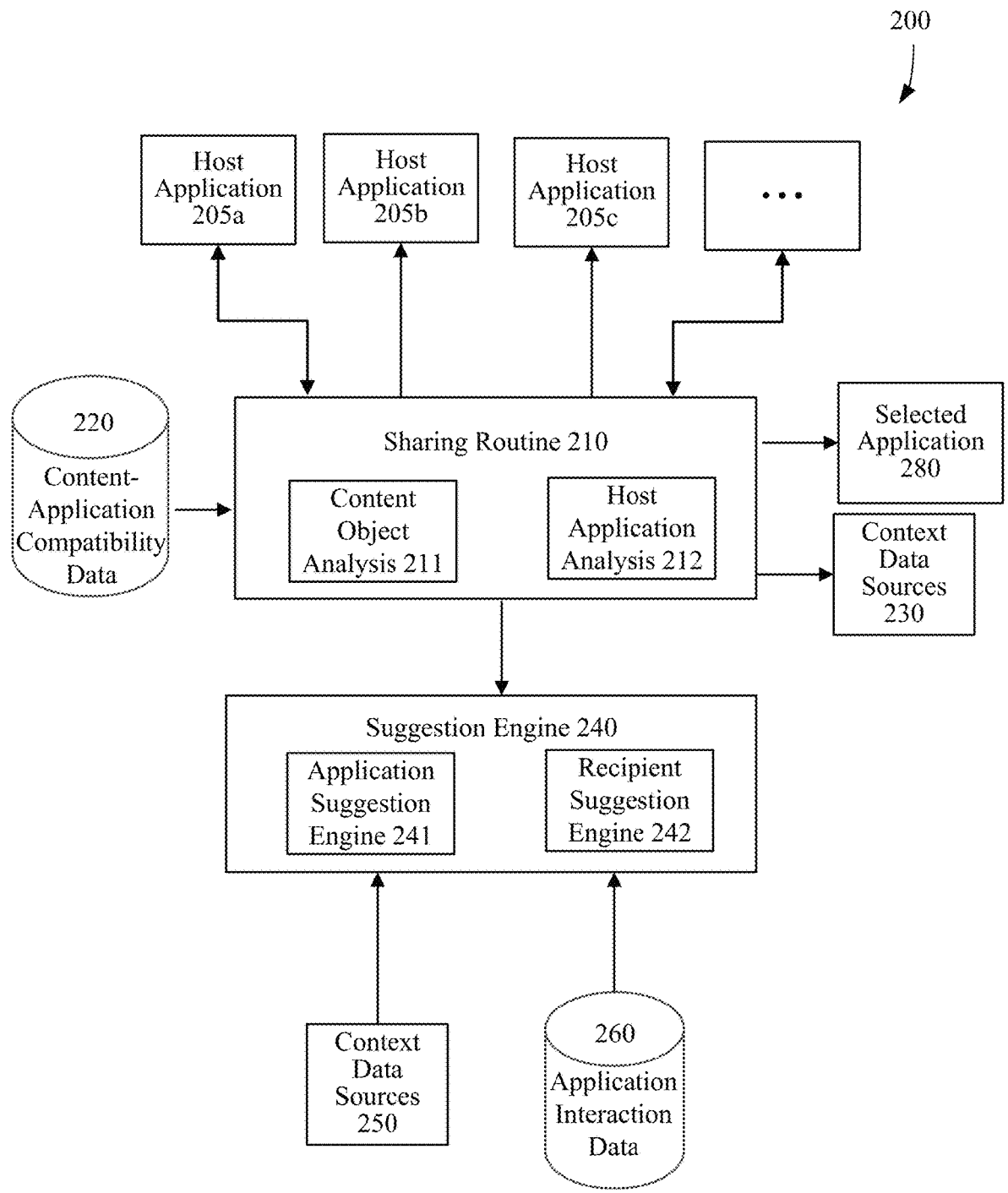
FIG. 2 shows an example system for sharing a content object using a sharing routine according to embodiments of the present disclosure.

FIG. 2 shows an example system 200 for sharing a content object using a suggested application according to embodiments of the present disclosure. System 200 includes host applications 205a-205c that can interface with a sharing routine 210, which can interface with a suggestion engine 240 that suggests one or more applications (and potentially recipients), as well as a selected communication application 280 for sharing the content object. These modules can interface with various other components as part of providing this functionality on a mobile device (e.g., a phone, tablet, or wearable device, such as a watch) or a larger computer that is not mobile.

Multiple host applications 205a-205c are shown communicably coupled with sharing routine 210. Such an interface can be provided in various ways, e.g., each of the host applications can include a framework that provides a UI to initiate sharing routine. Such a framework can include a list of selectable options at a bottom of a screen of the host application. Such a list of selectable options can be part of the host application or provided by the system software. If provided by the system software, the operating system can track which host application is in operation at a given time, so that communication can occur between sharing routine 210 and the host application that is currently executing.

Accordingly, at any given time, sharing routine 210 can be invoked via a function call from a host application or via a system call in response to a user request to begin a sharing session. As part of the invocation (e.g., a user selecting a button to share a selected content object), the host application can provide a host identifier and a content identifier to sharing routine 210. The providing of such data may be via other system software, e.g., that monitors for which application is currently being used and stores associated host identifiers for applications, such that the corresponding host identifier can be retrieved and provided to sharing routine 210.

Similarly, the host application can provide information to sharing routine 210 about the selected content object, e.g., a content type, size of the content object, and a content identifier (e.g., a memory location, a file identifier, a URL, etc.). As further examples, a host application can provide preferences to sharing routine, e.g., preferences for a communication application to be used (which may specify exclusions of a communication application). Such preferences may be based on historical interactions of other users of other devices.

Sharing routine 210 can perform various operations, including a content object analysis 211 and a host application analysis 212. Each of these services can use information obtained from the host application regarding the current session, e.g., as just described above. The outputs of these analyses can be sent to suggestion engine 240, e.g., as part of a ranking of likely applications or potentially to exclude certain applications. In other examples, sharing routine 210 can save the outputs of these analyses and modify an ordered list from suggestion engine 240 before displaying the ordered list.

For example, content object analysis 211 can access a database that includes content-application compatibility data 220, which can specify which applications support which content types. For example, the database can store a table that indicates a particular email app can support communicating an image, video, a URL, and others. But, potentially, the email app cannot support communicating a deep link to a particular page in a different application. In this manner, a non-supported (e.g., not installed) application can be excluded from any list of suggested applications that are provided in a user interface for the user to select.

Such exclusion can be performed by sharing routine 210 or suggestion engine 240. For example, the sharing routine can determine a list of one or more supported applications installed on the computing device that support the content type. The sharing routine 210 can exclude such non-supported (e.g., not installed) applications or transmit data corresponding the list of supported applications to the suggestion engine, which can exclude the non-supported applications.

As further examples, other information about the content object can be determined, such as people in a photo (or otherwise mentioned or appearing in the content object), graph knowledge of associations of the content object to applications or contacts (e.g., a graph of photos that highlight associations among people in the photos), metadata associated with content object, topics mentioned in text of the content object, text in a transcription of an audio file, or webpage domains and topics.

As for host application analysis 212, it can obtain the host identifier for sending to suggestion engine 240, which can use the host application in a suggestion model to determine which communication application is mostly likely to be selected for the current host application being used. As another example, host application analysis 212 can receive statistical information from the host application about historical interactions, where such statistical information can be passed to suggestion engine 240. Such historical information can be sourced from other devices and managed by the host application, where the statistical information can be aggregated and analyzed by a host server associated with the host application such that person information is not provided outside the device. A host application could also specific particular preferences for sharing particular types of content, e.g., particular content of a host application may be designed to be used by a specific communication application.

Sharing routine 210 can also obtain current context data from context data sources 230, e.g., movement information from an inertial motion unit (IMU), time and date from a clock and calendar app, location from GPS or other location circuitry, proximity to devices of other users that are in the device's contact list, and previous applications used before the host application. To measure proximity to other devices, ranging signals can be used, e.g., to measure time of flight, as is described in U.S. Provisional Application 62/738,915, which is incorporated by reference in its entirety. Content data sources 230 can save such data in memory, and sharing routine 210 can retrieve any such data that is desired. Alternatively, sharing routine 210 can contact the particular data sources and obtained the contextual data on-demand.

Suggestion engine 240 can receive a suggestion request from sharing routine 210, along with various information, e.g., as described above. In some embodiments, suggestion engine 240 can obtain any contextual data from context data sources 250, which may or may not be the same as context data sources 230. Thus, some contextual data can be obtained via sharing routine 210 and some contextual data can be obtained directly by suggestion engine 240.

Suggestion engine 240 can use application interaction data 260 stored in a database. Application interaction data 260 can store records of historical user interactions that can be mined for usage patterns (or usage pattern data) and/or similarities to a current context so as to suggest a list of application that are most likely to be selected. Such a list may be ordered. Each historical interaction can be recorded as a separate time entry in the database. Such records can be saved periodically, e.g., every two seconds or other time scale where it is likely only one type of interaction would occur per time interval (temporal encoding). Each historical user interaction record can include any of the contextual data mentioned herein. Further details about suggestion engine 240 are provided in later sections.

As shown, suggestion 240 includes an application suggestion engine 241 and a recipient suggestion engine 242. The suggestions of application and recipients can operate independently or as a single suggestion engine. For example, a suggestion of a recipient can be applicable to other instances than when a content object is shared from a host application, e.g., when a communication application has already been selected. Either of these suggestion engines may utilize models described herein. When the two engines act as a single engine, a most likely pair of communication application and recipient can be identified. Such a pair can still be applicable even when the user has already selected the communication application.

A. The Sharing Routine

The sharing routine 210 may be implemented in various forms, providing different functionality and capabilities when executing on a mobile device 100. In some embodiments, sharing routine 210 may be called/invoked in response to the selection by a user of one or more content objects within a host application 205, followed by the actuation of a dedicated share button, icon, and/or menu option provided within the host application 205. Thus, the sharing routine provides advantages by supporting a common and uniform sharing functionality that is agnostic with respect to content object types, host applications, and target applications (i.e., applications potentially selected to share the content object). Thus, rather than each individual host application 205 supporting separate sharing functionality, the common sharing routine 210 may be invoked various different host applications 205 executing on the device 100.

Figure 3:
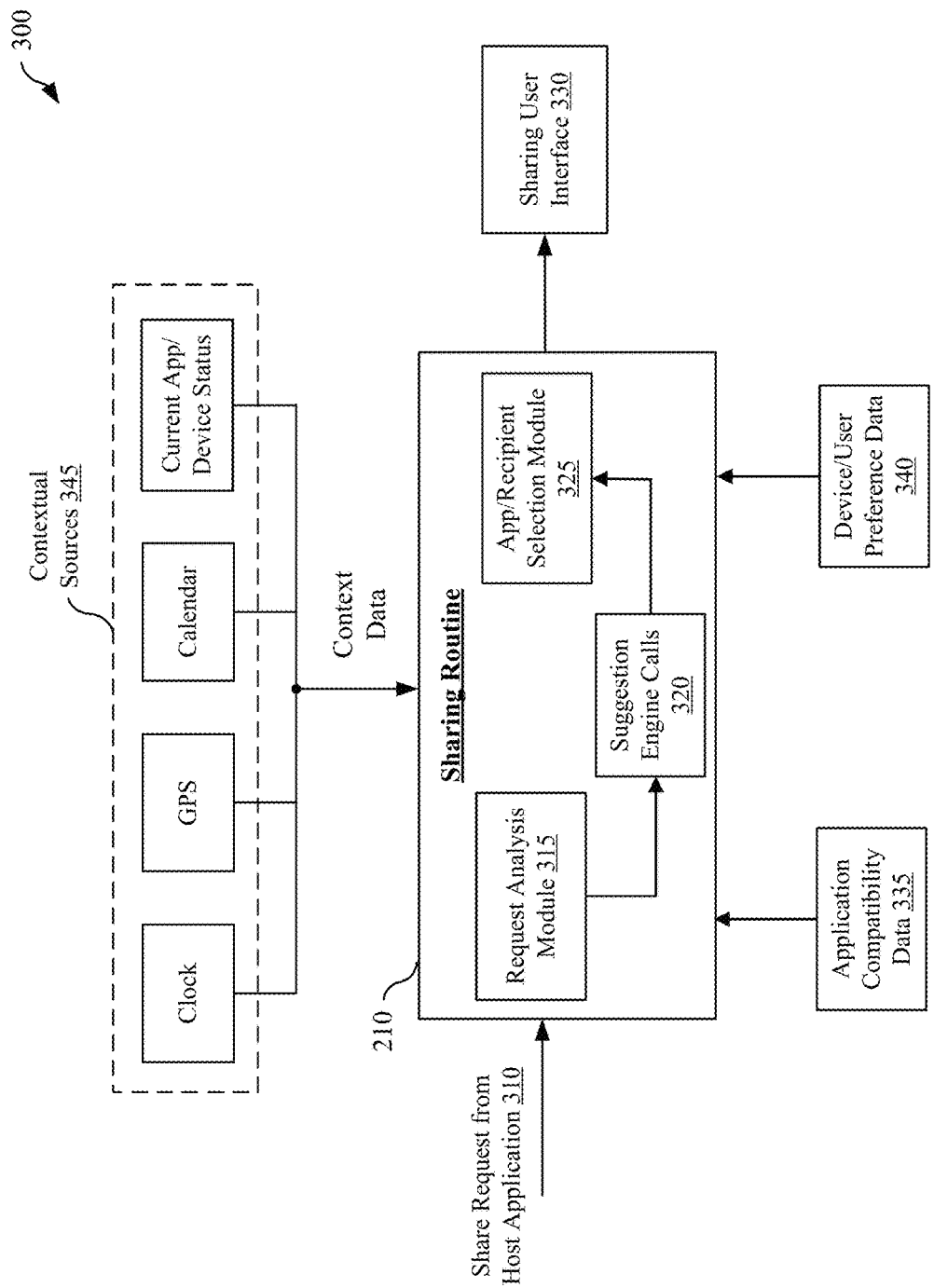
FIG. 3 is a block diagram of illustrating a sharing routine according to aspects of the present disclosure.

FIG. 3 is a block diagram illustrating various modules and components of an illustrative sharing routine 210, as well as associated data source which may be accessed by the sharing routine. As shown in this example, sharing routine 210 may be invoked when share request 310 is received from a host application 205. A request analysis module 315 within the sharing routine 210 may be configured to analyze the request and identify data relating to the content object to be shared (e.g., content type, content size, etc.), and relating to the host application from which the request was received (e.g., host application name and ID, host-specific sharing requirements, etc.). In some embodiments, the sharing routine 210 may be configured to invoke the suggestion engine 240 via calls 320, providing the suggestion engine 240 with certain sharing request data such as the user, content object type, host application, etc. Additionally or alternatively, the sharing routine 210 might not invoke the suggestion engine 240, but instead may determine application suggestions and/or recipient suggestions in a separate processing module. For instance, the sharing routine 210 may include one or more application/recipient selection modules 325, which may operate independently to determine application and/or recipient suggestions, or may operate in conjunction with the suggestion engine 240 to customize, filter, and/or rank the suggestions received from the suggestion engine 240. In some cases, the sharing routine 210 may enforce a limit of the maximum number of suggested applications and/or recipients that may be displayed via the user interface. After the determination of application suggestions and/or recipient suggestions, the sharing routine 210 may generate and provide a user interface as an overlay to the host application 205, allowing the user to select one or more applications and/or one or more recipients for sharing the content object.

In some embodiments, to perform the functionality with modules 315-325, the sharing routine 210 may retrieve data from additional data sources which may be internal or external to the device 100. For example, the sharing routine 210 may retrieve and use application compatibility data 335, which may include one or more listings of content types and the corresponding applications installed on the device 100 which support those content types, and vice versa (i.e., listings of applications and the corresponding content types supported by the application). The sharing routine 210 may use the application compatibility data 335 before and/or after receiving application suggestions from the suggestion engine 240, to ensure that the application suggestions provided within the user interface are compatible with the type of the content object to be shared. Additionally, the sharing routine 210 may retrieve and use device/user application preference data 340, which may include listings of user-specific, device-specific, and/or application-specific sharing preference data. For example, in some embodiments, individual users, host applications, and/or target applications may provide preferences to the sharing routine 210 with respect to particular content object types, particular recipients, particular counterpart applications, etc. The preference data 340 may take the form rankings, blacklists, whitelists, etc., and may be used by the sharing routine 210 to override the suggestions from the suggestion engine 240 to prevent display of a particular recipient and/or application, based on the user, content type, host application, and/or other context data.

Additionally, the sharing routine 210 may retrieve and use data from one or more contextual data sources 345, which may be collected and stored as context data associated with the share request, and then used as inputs to the suggestion engine 240 (or a suggestion module with the sharing routine 210) to better optimize the application and recipient suggestions. Contextual data sources 345 may include, for example, a system clock of the device 100 to provide a current date/time, a GPS receiver to provide the current location of the device, a calendar application of the device 100 to determine when (and with who) the user may have an upcoming appointment. The sharing routine 210 also may access additional contextual sources 345, including a listing maintained by the device of applications currently installed on the device 100. Such listings may include when each application was installed, which applications are currently running and/or which applications were recently used. Further examples of context data sources may include the networks to which the device 100 is currently connected, and/or any other nearby devices that may be detected via short-range wireless communications (e.g., Bluetooth). In still other examples, contextual data sources 345 may include separate external data which may be used for user tracking and monitoring, such as personal fitness tracker, smart watch, cameras, and the like. Such user activity data and other user monitoring data may be used to train the models and detect correlations between certain activities of the user and particular target applications and/or recipients for sharing content objects.

B. The Suggestion Engine

The suggestion engine 240 can be implemented in various forms and use various models. For example, more than one model may be used, and the results of the models can be merged in an ensemble engine. A first type of model can run periodically (e.g., every night), but then be saved such that it is static until the next training session is performed. Such training can include a pattern mining routine that mines the historical user interactions for patterns of when an application, recipient, or combination of application/recipient are selected. A second type of model can use recent interactions to generate a model on-demand when a request for a suggestion is received.

Figure 4:
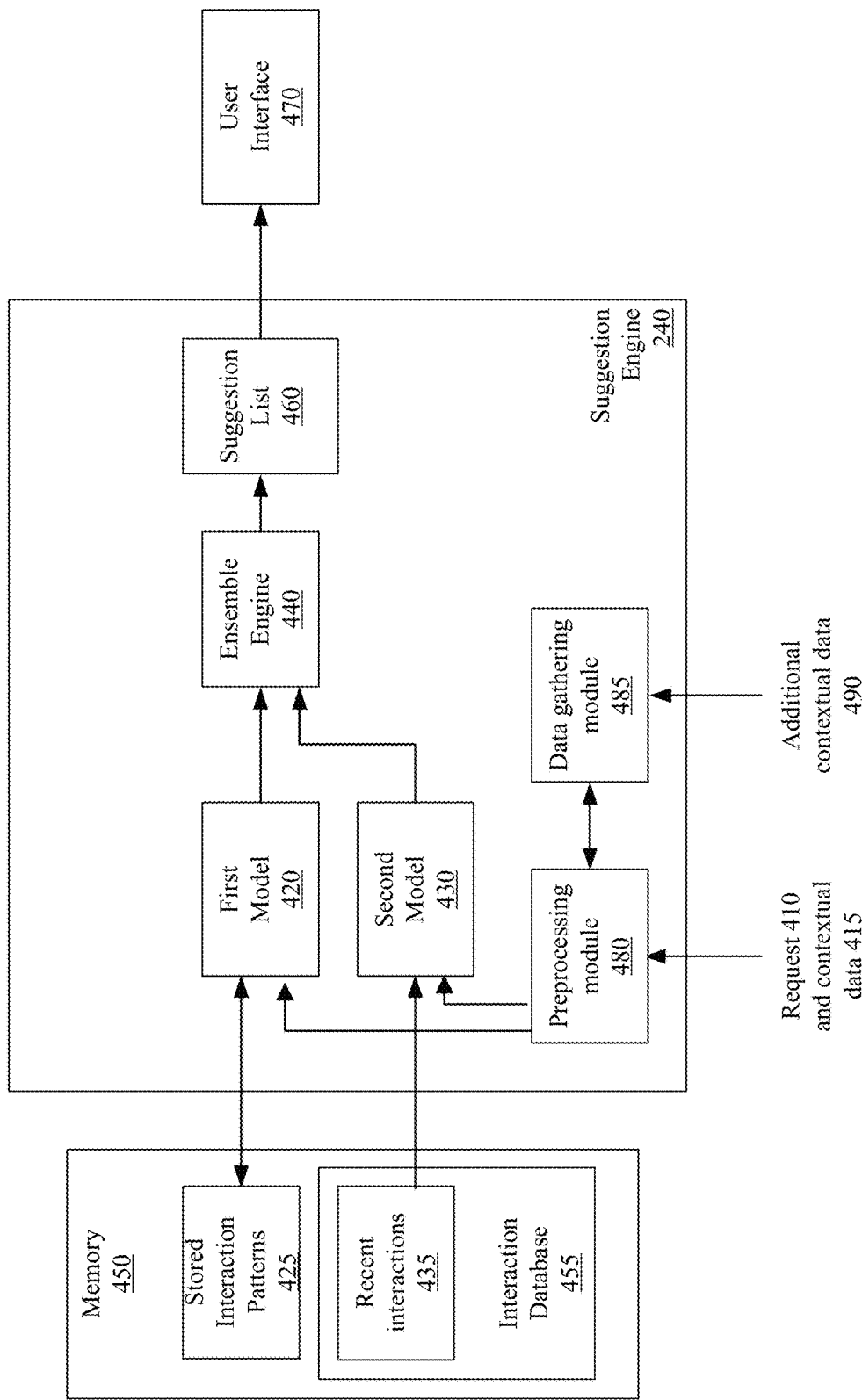
FIG. 4 is a block diagram illustrating a suggestion engine with two types of models according to aspects of the present disclosure.

FIG. 4 is a block diagram illustrating a suggestion engine 240 with two types of models according to aspects of the present disclosure. Suggestion engine 240 may include a first model 420, a second model 430, and an ensemble engine 440. The first model 420, the second model 430, and the ensemble engine 440 may be implemented by the processor of a device (e.g., mobile device 100) and may generate suggestions for recipients and/or apps, e.g., for sharing a content object as described above. In various implementations, the first model 420, the second model 430, and the ensemble engine 440 may be implemented by hardware and/or software separate from the processor of the mobile device. The first model 420 and the second model 430 may each correspond to an application suggestion engine, a recipient suggestion engine, or a combination of both.

The first model 420 may be a pattern model that uses stored interaction patterns 425, which can be determined from historical user interactions in an interactions database 455 of memory 450. The stored interaction patterns 425 can be generated periodically, e.g., as described above for the first type of model. A pattern mining engine (not shown) can retrieve the historical user interactions from interaction database 455, identify interactions patterns, and then store the interaction patterns 425 in memory 450. Then, when a request 410 is received, the first model can retrieve any relevant interaction patterns (or all the patterns and then identify any relevant ones), where relevancy can be determined based on contextual data 415. Contextual data 415 may include any of the various data described herein, e.g., a host app identifier, a content identifier, a type of a content object, a communication application that has already been selected (e.g., when only a recipient needs to be determined), location, etc. Further details of such a pattern model can be found below and in Srinivasan et al. (2014), "Mobil-eMiner: Mining your frequent patterns on your phone," UbiComp 2014—Proceedings of the 2014 ACM International Joint Conference on Pervasive and Ubiquitous Computing. 389-400. 10.1145/2632048.2632052.

The second model 430 may be generated when a prediction is triggered, as opposed to using a stored model, e.g., as stored usage/interaction patterns 425 are used. When a prediction is triggered, the second model 430 may retrieve a number of the most recent interactions 435 from the interaction database 455 in the memory 450. Similarities between the current context and the recent interactions 435 can be analyzed to determine one or more likely communication applications, recipients, or combinations of the two. For example, the recent interactions 435 can be organized into a plurality of clusters, where each cluster has a same set of contextual data. Then, a distance from the current contextual data to the clusters can be determined. A frequency and distance to the nearest clusters can be used to determine the most likely communication applications, recipients, or combinations of the two. Accordingly, a nearest neighbor algorithm, e.g. K Nearest Neighbors algorithm, may be executed to identify interactions that are nearest neighbors to the current context. Recipients and apps for a user to share with may be suggested based on probabilities of the recent interaction being similar to the current context.

Accordingly, interaction data for generating suggestions may be stored and retrieved from the database 455. A pattern mining engine may operate on the interaction data 435 to identify usage patterns (e.g., sets of items and that may be common to a number of interactions). Using the identified patterns, the pattern mining may generate rules and store the rules as usage/interaction patterns 425. And, a second model can use only the most recent interactions (e.g., 100, 500, 1000, or more) to generate an on-demand model that determines similarities (distance) of the current context to those of recent interactions.

Suggestion engine 240 may be invoked when request 410 is received, e.g., from a sharing routine, such as sharing routine 210. Suggestion engine 240 may be invoked in other ways, e.g., from a selected communication application, which can occur in a different scenario. The request 410 can be received along with contextual data 415, e.g., obtained from context data sources 230 in FIG. 2. The reception of request 410 can trigger a prediction to be made to provide a suggested list of application, recipients, or a combination of both.

Preprocessing module 480 can receive the request 410 and any contextual data 415. Preprocessing module 480 can identify the types of data in the contextual data and perform any formatting or labeling for providing to first model 420 and second model 430. For example, a model may require data to be provided in a particular order or format. Preprocessing module 480 can also determine which model(s) to use and which order to use them. Other models may also exist, e.g., as described herein. Preprocessing module 480 can determine a type of request and/or the requesting module (e.g., a sharing routine or a communication application) to determine which model to use and the parameters provided to those models (e.g. whether to suggest applications, recipient, or a combination of both). Further, preprocessing module 480 can trigger a data gathering module 485 to obtain additional contextual data, e.g., content data sources 250 as shown in FIG. 2.

When a prediction is triggered, the first model 420 may compare the current device context specified in contextual data 415 to the patterns in the stored interaction patterns 425 to generate suggested recipients/apps, e.g., for a user to share a content object with. In response to the request trigger, the second model 430 may generate an on-demand model (e.g., a cluster model) and then compare the current device context to recent interactions.

The ensemble engine 440 may aggregate the suggestion(s) from the first model 420 and the suggestion(s) from the second model 430 to generate a final suggestion list 460. The ensemble engine 440 may order the final suggestion list 460 based on the source of the suggestions.

The user interface (UI) 470 of the device may display the final suggestion list 460, e.g., as a UI of a sharing routine. The final suggestion list 460 may be displayed in graphical form, for example using icons or photos to represent the suggested recipients and an icon to represent the suggested app. A highest ranking suggested recipient may be indicated by a prominently displayed photo or icon, for example, a larger photo or icon than other suggested recipients or simply by its position in an ordered list. Further details for such a UI are provided below.

The suggestion engine 240 also may have various additional features and details, including any or all of those described in concurrently filed U.S. Pat. Appl. No. 62/843,895, filed on May 6, 2019, and entitled "PEOPLE SUGGESTER USING HISTORICAL INTERACTIONS ON A DEVICE", which is incorporated by reference herein in its entirety for all purposes.

III. Example Method of Providing Application/Recipient Suggestions for Sharing Content Objects Using the example system described above, one or more components (e.g., sharing routine 210, suggestion engine 240) installed on a mobile device 100, and other computing devices, may be configured to share content objects between different applications and different computing devices. Therefore, rather than individual host applications supporting their own separate sharing functionality, common sharing/suggestion techniques may be invoked from any of multiple different host applications 205. Such techniques may allow users to specify the content object(s) to be shared, the application(s) used to share the content objects, and the recipient(s) with whom the content objects are to be shared.

Figure 5:
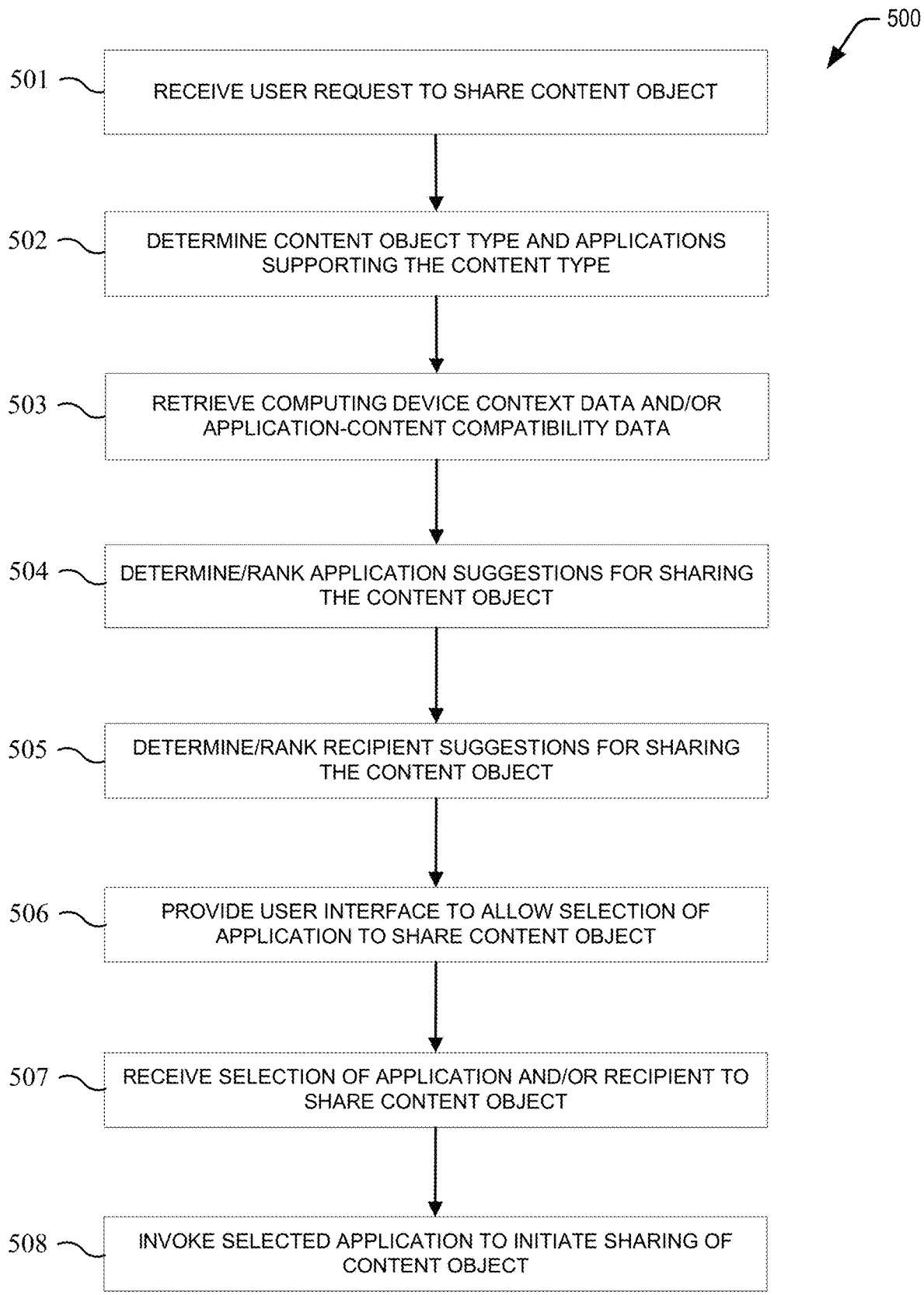
FIG. 5 is a flowchart illustrating a method for providing content object sharing functionality using a sharing routine according to aspects of the present disclosure.

FIG. 5 is a flowchart illustrating an example process of providing content object sharing functionality using a sharing routine executing on a computing device, including determining application suggestions and/or recipient suggestions, in response to a request from a host application to share a content object. The steps in this example process are described briefly below; and each step 501-508 is revisited and discussed in more detail in the subsequent sections.

In step 501, the sharing routine 210 may receive a request from a host application 205, the request indicating that one or more content objects has been selected by a user within the host application 205 to be shared. In step 502, in response to the sharing request received in step 501, the sharing routine 210 may determine the host application 205 from which the request was received, the type of the content object(s) to be shared, and/or a list of applications installed on the computing device 100 that support the content object type. In some cases, the host application 205 may provide a host identifier (e.g., host ID or host name), and/or data identifying the type of the selected content object, within or associated with the request. In step 503, the sharing routine 210 may retrieve data from one or more additional data sources, including application-content compatibility from a data source 220, and context data from a data source 230. In step 504, the sharing routine 210 may determine and/or rank a set of suggested applications to be used for sharing the content object. As described below, in some embodiments, sharing routine 210 may invoke the suggestion engine 240 to retrieve application suggestions for sharing the content object. In step 505, the sharing routine 210 may determine and/or rank a set of suggested recipients to whom the content object may be shared. As described below, in some embodiments, sharing routine 210 also may invoke the suggestion engine 240 to retrieve recipient suggestions for sharing the content object. In step 506, the sharing routine 210 may provide a user interface to present one or more application suggestions and/or recipient suggestions that may be selected by the user for sharing the content object. In step 507, the sharing routine 210 may receive user selections of one or more applications to be used for sharing the content object, and/or one or more recipients with whom the content object is to be shared. Finally, in step 508, after the user selects an application with which to share the content object, and/or recipients with whom the content object is to be shared, the sharing routine 210 may invoke the selected (target) application and provide the invoked application with the content object to be shared.

IV. Sharing Routine Invoked by Host Application

As noted above, a sharing routine 210 installed on a mobile device 100, and other computing devices, may be configured to facilitate sharing of particular content objects between different applications and different computing devices. Rather than each individual host application supporting its own sharing functionality, a common sharing routine 210 may be invoked by any of multiple different host applications 205 executing on the device 100. Within the sharing routine 210, users may specify the content object(s) to be shared, the application(s) used to share the content objects, and the recipient(s) with whom the content objects are to be shared.

When sharing routine 210 receives a request from a host application 205 (e.g., in step 501), the request may indicating that one or more content objects has been selected by a user within the host application 205 to be shared. As noted above, the host application 205 may be any application executing on the computing device 100 with which users interact. For example, the host application 205 may be photograph library application, an Internet browser application, a social media application, an email application, a messenger application, a map application, and so on. The various host applications 205 may provide user interface components to allow users to select content objects, and then a share button, icon, or menu option to invoke the sharing routine 210 on the objects currently selected within the user interface of the host application 205. Any type of content object supported for display/interaction by a host application 205 may potentially be selected for sharing, including without limitation content types such as digital images or videos, music files, emails, documents, web links, spreadsheets or data stores, locations, social media posts, and any other digital content supported by one or more host applications 205 on the device 100.

In response to receiving a sharing request from a host application, the sharing routine 210 may (e.g., in step 502) determine the host application 205 from which the request was received, the type of the content object(s) to be shared, and/or a set of application installed on the device 100 that support the content object type. In some cases, the host application 205 may provide a host identifier (e.g., host ID or host name), and/or data identifying the type of the selected content object, within or associated with the request. However, in other cases, the sharing routine 210 may be configured to determine the host application type and/or lookup an associated host identifier from an application table within the device 100. Additionally, the sharing routine 210 may look-up the content object types based on the host application 205 and/or analysis of the object data received in the request. In some embodiments, the host application 205 may generate and provide a copy of the content object itself to the sharing routine 210, while in other cases the host application 205 may provide only a link or address to the objects to be shared. Additionally, the sharing routine 210 may potentially determine that a content object may map to multiple different content object types, and/or that the content object may be easily converted from its native application type to one or more different compatible types (e.g., multiple image formats, document formats, etc.). Thus, the sharing routine may identify multiple content object types for a single object in some cases.

In some embodiments, the sharing routine may retrieve data from one or more additional data sources, including application-content compatibility from a data source 220, and context data from a data source 230, as described above in step 503. Application-content compatibility data and context data are described below in more detail; however, it should be understood that either or both of these data may be optional in some embodiments. Additionally, several other examples of further data sources are described below, from which additional types of data may be retrieved and used to assist in the application suggestions and/or recipient suggestions for sharing the content object.

Application-content compatibility data which may be retrieved may correspond to a listing of which applications current installed on the device 100 are compatible with the content type of the object(s) to be shared. That is, for each content object type determined, the application-content compatibility data may include a listing of applications installed on the device 100 that are capable of displaying or otherwise supporting that content object type. In some cases, application-content compatibility data may be stored as a data structure (e.g., table or matrix) within a centralized device storage 220, while in other cases the sharing routine 210 may determine the compatibility data for the content object type by separately querying or accessing a look-up table with compatibility data that is stored individually by each application installed on the device.

The context data which may be retrieved by the sharing routine 210 may include data from various sources relating to the current operational environment of the computing device 100, as well as the current states of the various applications and capabilities of the device 100. For example, as shown in FIG. 3, the current context data of device 100 may include the current date/time and the current location of the device which may be retrieved respectively from a system clock and local GPS receiver. Additional context data may include the current user of the device 100, which may be advantageous to retrieve in embodiments where the device 100 may be shared may multiple users, such as household devices or workplace devices. For multi-user devices, the current device user may be retrieved by identifying the current user profile or login credentials, etc.

Further context data retrieved by the sharing routine 210 may be determined by accessing the applications, communication systems, and other capabilities of the device 100. For instance, the sharing routine 210 may access the phone, calendar, email, and messaging applications of the device 100 to detect when the user in a current communication session with other users, and/or when (and with who) the user may have an upcoming appointment listed in their calendar. Additionally, context data from applications may include the list of applications currently installed on the device 100, when each application was installed, which applications are currently running and/or which applications were recently used. Still further examples of context data retrieved by the sharing routine 210 may include the networks to which the device 100 is currently connected, and/or any other nearby devices that may be detected via short-range wireless communications (e.g., Bluetooth).

As described below in more detail below, the data from the various data sources may be used by the sharing routine 210 to assist in the determination of application suggestions and/or recipient suggestions for sharing the content objects. For instance, in some embodiments, the sharing routine 210 may transmit any or all of the retrieved data (e.g., a list of compatible applications received from database 220, context data 230, etc.) into the suggestion engine 240. In other embodiments, the sharing routine 210 may use the list of compatible applications 220 to filter and pare down the application suggestions received from the suggestion engine 240. In still other embodiments, a suggestion engine 240 need not be invoked, and instead the sharing routine 210 may fully determine the set of suggested applications for sharing the content object based on the data retrieved from the various data sources.

Either or both of the application-content compatibility data and the context data discussed above may be optional and need not be retrieved by the sharing routine 210 in some embodiments. For example, the sharing routine 210 might not retrieve or rely on any context data, but instead only the suggestion engine 240 might retrieve and use context data when determining application suggestions and recipient suggestions. Additionally, in some cases, application-content compatibility data and/or context data may be retrieved by the sharing routine 210 only after receiving the initial application and recipient suggestions from the suggestion 240, so that that sharing routine 210 may filter or refine the suggestions based on the application-content compatibility data and/or context data.

Additionally or alternatively to the application-content compatibility data and current context data discussed above, various other types of data from different data sources may be retrieved by the sharing routine 210 and used to assist in the determination of application suggestions and/or recipient suggestions. For example, the sharing routine 210 may maintain a subset of hardcoded application suggestions and/or recipient suggestions that are always to be used within the sharing user interface window. In other cases, individual users/profiles, the device itself, particular host applications, and/or particular target applications (i.e., the applications used to share the content objects) all may have individual preferences, whitelists, blacklists, etc. Each of these additional data sources may be retrieved by the sharing routine 210 and/or suggestion engine 240 to help determine which applications and which recipients are listed within the sharing user interface.

V. Application Suggestions by Suggestion Engine

In some embodiments, the sharing routine 210 may invoke the suggestion engine 240, to retrieve application suggestions and/or recipient suggestions for sharing the content object. As noted above, the suggestion engine 240 may be implemented as one or more software components configured to suggest applications for sharing the content object. Suggestion engine 240 may use various algorithms, including one or more trained machine learning models that may be merged in an ensemble engine. Trained models used by the suggestion engine 240 may be trained using historical user interactions with a plurality of applications installed on the computing device, The training can identify patterns of when an application, recipient, or combination of application/recipient are selected. Additional models may be based on other application interactions, device usage data, context data, and the like.

Figure 6:
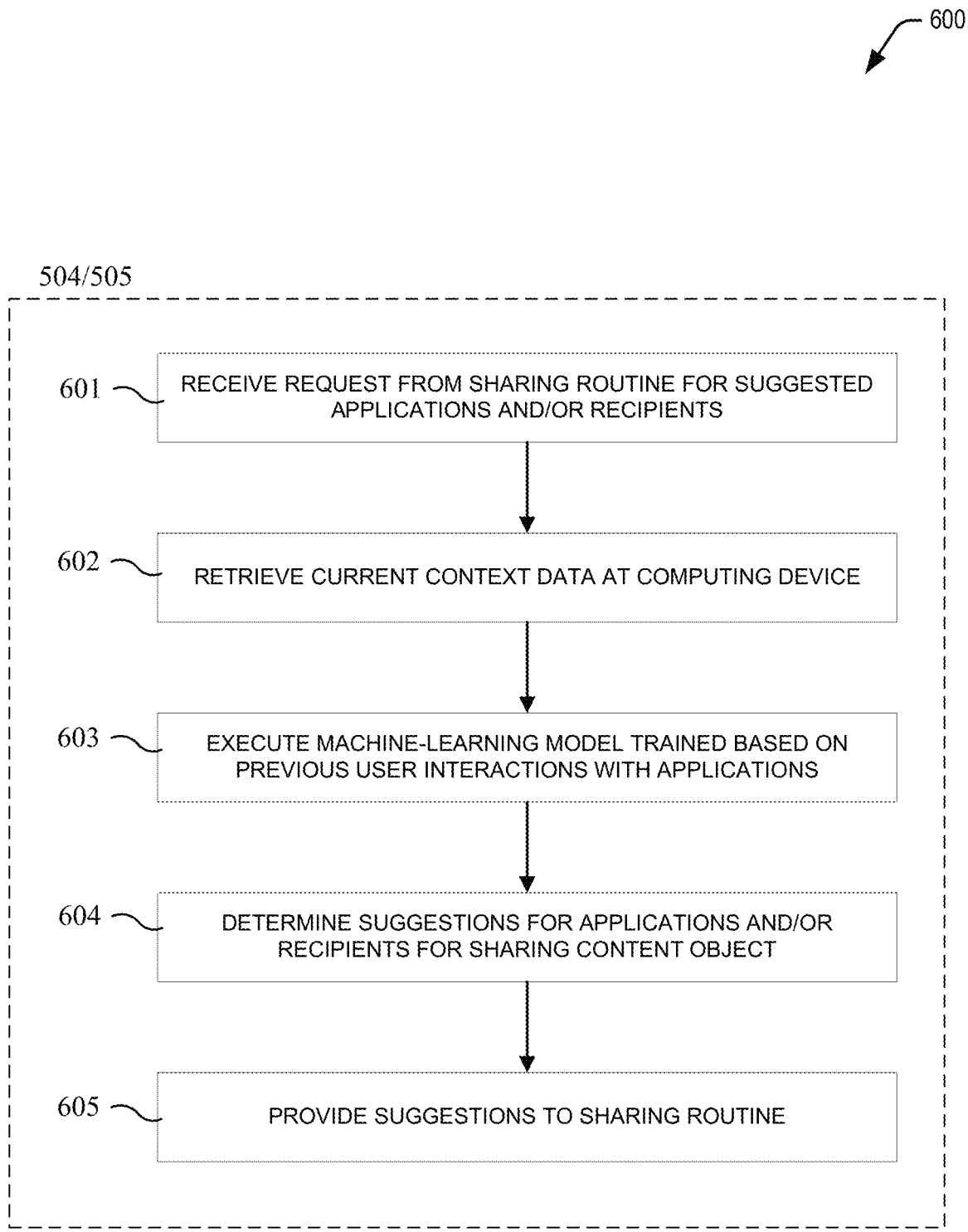
FIG. 6 is a flowchart illustrating a method for providing application suggestions and recipient suggestions for sharing a content object, using a suggestion engine according to aspects of the present disclosure.

In some examples, when the sharing routine 210 invokes the suggestion engine 240 to determine application suggestions (e.g., in step 504) and/or recipient suggestions (e.g., in step 505), the functions performed by the suggestion engine 240 in providing the suggested applications and/or recipients are described in steps 601-605 of FIG. 6. In these steps, the suggestion engine 240 may receive a request from the sharing routine 210 for suggested applications for sharing a content object, may receive/retrieve various data relevant to the request, and execute one or more models to determine a set of suggested applications to be returned to the sharing routine 210.

However, although these examples describe requests from the sharing routine 210 to the suggestion engine 240, it should be understood that these requests and the suggestion engine 240 itself may be optional in some embodiments. For example, the sharing routine 210 may perform analyses based on the data retrieved from various data sources, in order to determine suggestions for applications and recipients. In other embodiments, the sharing routine 210 and suggestion engine 240 may be implemented as a single system, so that all of the computing infrastructure and functionality of the suggestion engine 240 are incorporated within the sharing routine 210. Also, in some cases, the suggestion engine 240 may be called by the sharing routine 210 only for application suggestions but not for recipient suggestions, or vice versa.

In step 601 of FIG. 6, the suggestion engine 240 may receive a request from the sharing routine 210 for a set of applications to be suggested for sharing a content object. In some embodiments, the request from the sharing routine 210 in step 601 may include data identifying the type of the content object being shared, the host application 205 from which the object is being shared (e.g., a host ID), and/or the user that initiated the sharing via the host application 205. In some cases, the request to the suggestion engine 240 in step 601 also may include one or more metadata fields of the content object being shared (e.g., keywords within a shared document, individuals or objects within shared picture, etc.). Additionally, the request in step 601 may include one or more data items retrieved by the sharing routine 210, such as context data, a listing of installed applications that are compatible with the content object, user/device/application preferences data, etc. However, in other embodiments, some or all of these data may be retrieved directly by the suggestion engine 240, instead of or in addition to being retrieved by the sharing routine 210.

In step 602, the suggestion engine 240 may retrieve one or more sources of current context data at the computing device. Thus, step 602 may be similar or identical to the retrieval of context data by the sharing routine 210. As discussed above, the various context data may include, for example, the current date/time, current location of the device 100, and the current user of the device. Additional context data may include data retrieved from the device applications, including phone data, calendar data, email data, and messaging data to allow the suggestion engine 240 to detect the current communication sessions and appointments of the user, as well as network connection data and data identifying other nearby computing devices. As noted above, in some cases the retrieval of context data by the suggestion engine 240 may be optional, such as when context data is not needed by the current models of the suggestion engine 240 and/or when the sharing routine 210 retrieves and passes the required context data to the suggestion engine 240 with the request.

In step 603, the suggestion engine 240 may execute one or more models, which may include machine-learning models trained based on previous user interactions with the applications installed on the device 100. In some embodiments, the suggestion engine 240 may access and execute two or more models each for suggesting applications, and then merge the models in an ensemble engine. For example, the suggestion engine 240 may invoke both a pattern model and a cluster model. The pattern model may be trained based on previous user interactions with applications and/or previous instances of sharing content objects. More specifically, the pattern model may tune the suggestions of applications to be more specific to the user's behavior based on their past behaviors. A pattern model may operate on all interaction data stored in the interaction database to generate rules based on identified repetitive patterns of features. The pattern model may extract data from the interactions, output a separate database (e.g., a pattern database) that may be queried using a set of input criteria (e.g., a host application, target application, user, location, time of day, etc., and the pattern database may specify a list of applications to suggest. In various other embodiments, the interaction training data may include data such as previous recipients, previous host applications, previous content types, previous content properties/metadata, and previous applications selected for sharing the content objects. Once trained, the model may be executed using data associated with the current request as input to the model, to determine one or more application suggestions. Pattern models also may take various other forms besides database of rules having certain criteria as an antecedent and outputting suggested applications. For example, in some implementations, a neural network may be used in the pattern model.

In some cases, a pattern mining process may mine and form context patterns and associative rules. Using such techniques, interesting and unexpected correlations may be determined, for instance, sharing documents having certain keywords with a particular friend/group of friends, sharing pictures of certain people/objects using a particular application, etc. Within such a process, a pattern mining algorithm may take all interactions within a set of time windows, and across all of the interactions across all time windows for which data exists, and find patterns in the features across the interactions that occur inside of the time windows. An example of such association rule learning to find the frequent patterns is called the Apriori algorithm. Further details can be found in Srinivasan et al. (2014), "MobileMiner: Mining your frequent patterns on your phone," UbiComp 2014—Proceedings of the 2014 ACM International Joint Conference on Pervasive and Ubiquitous Computing. 389-400. 10.1145/2632048.2632052. The pattern model can execute on the whole interaction history using all of the stored interaction data in the database to find these rules.

As an example, for multiple time windows (e.g., 2 secs), an interaction may be stored for a given recipient, target application (e.g., communication application used to share the content object), and/or other features as discussed above.

An algorithm (e.g., the Apriori algorithm) may examine each window and identify recurring patterns of features over time. Patterns that occur a number of times that exceeds a minimum threshold may be identified as frequent patterns. For example, a pattern of sending an email to a particular recipient in the evening on certain days of the week may be identified as a frequent pattern. Based on the frequent patterns identified, the training algorithm may generate rules having an antecedent and a consequent. The antecedent may be a state of the features (e.g., the context of an interaction) and the consequent may be a suggestion (e.g., recipient and/or application). For example, the algorithm may identify a certain feature pattern that exceeds a minimum threshold in the overall number of interactions. For the feature pattern, the antecedent led to a particular consequent (e.g., a recipient and/or an app) a certain percentage of the time, e.g., above a threshold percentage. When the pattern database is queried using the current context as the antecedent, the query may search for the rule antecedent being equal to or containing items from the current context and may examine the consequent to determine if it contains a recipient and/or an application. The recipient and/or application the consequent may be returned as a suggestion. In some embodiments, application and/or recipient suggestions from the suggestion engine 240 may be sorted based on confidence (e.g., how likely the occurrence is) and/or frequency of occurrence.

During the antecedent matching in response to a share request, rules having antecedents containing any of the features in the current context may be identified. Several different rules may be identified that match the current context at least in part. Each rule may have a different number of antecedent features based on the previous pattern matching. When a prediction is initiated, the current context may be captured and rules may be identified in which the antecedent contains one or more features of the current context. Different subsets of the features in the current context may match to different antecedents. One rule might match because a user often shares to this person at a particular time, and another rule might match because the user shares with a particular person at a particular location, and so on. In each case, those rules may be sorted using a confidence metric, corresponding to how often that antecedent applies to that consequent based on past interactions. Each identified rule may generate a different application and/or recipient suggestion.

The same model and/or additional models may be based on other patterns of user-application usage and interactions, current context data, and the like. For example, one or more models may be trained based on the user's previous usage patterns of different applications, including how often the user interacted with different applications, the types of interactions performed within the different applications (e.g., communication sessions initiated with other users/devices), the user's interactions with the specific content object type within the different applications, and how often/how recently the user performed these interactions. Additionally models may be trained based on context-specific variables, including the user's location, the current time and day, the user's current network and other nearby devices, etc. Once trained, these models may be executed using the current request data and/or current context data as input, to determine additional application suggestions.

As noted above, in certain embodiments, the suggestion engine 240 may rely on analysis and/or trained models using data from various applications installed on the device 100 (e.g., usage amounts and patterns, specific user functions or interactions executed within the application, etc.). In some cases, such application data may be retrieved via system tables and event logs of the device, while in other cases the sharing routine 210 and/or suggestion engine 240 may access third-party applications directly to retrieve such data. In some embodiments, the device 100 may support a framework that allows third-party application developers to "donate" (or provide) data corresponding to certain actions that the user has performed using the third-party application, such as instances of messages being sent to other users via the third-party application. In such embodiments, the suggestion engine 20 may access this donated data and store the data in a database maintained by the sharing routine 210 and/or suggestion engine 240.

In step 604, the suggestion engine 240 may suggest a set of one or more applications to be used for sharing the content object. In this example, the determination may be based on the execution of the trained models in step 603, using as inputs data corresponding to the current search request, current context data, etc. Thus, the suggested applications determined in step 604 may be based at least on the type of the content object to be shared, the current context data, and the host application from which the share request was initiated. In other examples, other machine learning models may be used, such as neural networks or linear regressions, and the machine learning models may be trained in various different conditions to determine optimal application suggestion sets for different possible share requests. In step 605, the suggestion engine 240 may provide the set of suggested applications back to the sharing routine 210.

VI. People Suggestions by Suggestion Engine

As discussed above, the sharing routine 210 may invoke the suggestion engine 240 to retrieve a set of suggested applications for sharing the content object. Additionally or alternatively, the sharing routine 210 may invoke the suggestion engine 240 to retrieve a set of suggested recipients to whom the content object may be shared. In some cases, the sharing routine 210 may make a single call to the suggestion engine 240 to retrieve both application suggestions (e.g., in step 504) and recipient suggestions (e.g., in step 505), while in other cases the sharing routine 210 may invoke the suggestion engine 240 twice and/or may invoke two separate suggestion engines 240 configured to execute and/or merge different combinations of models.

When retrieving application suggestions and/or recipient suggestions, a similar or identical sets of functions may be performed by the suggestion engine 240, those described in steps 601-605 of FIG. 6. As discussed above for application suggestions, the suggestion engine 240 may receive a similar request from the sharing routine 210 to provide a set of suggested recipients. In response, the suggestion engine 240 may receive/retrieve various data relevant to the request, execute one or more models to determine a set of suggested recipients, and then return the suggested recipients to the sharing routine 210.

Although similar or identical process steps 601-605 may be performed for the determination of suggested applications and suggested recipients, in some embodiments, different models and combinations of models may be trained based on different interaction data. For example, one or more models for suggesting recipients may be trained based on specific properties and metadata of the content objects, such as specific people or objects identified within shared images, keywords identified within shared articles/documents, etc.

Using such data, the models may learn a user's tendency to share pictures of certain people or places with a particular recipient or group of recipients, and the user's tendency to share documents of a certain topic with a particular recipient or group of recipients, and so on. Other models for suggesting recipients may be trained based the user's location, current networks, and/or other nearby devices, to determine correlations between the user's location and surrounding and the recipients with whom they share content objects. In still other examples, models for suggesting recipients may be trained based the user's concurrent and recent communication sessions (e.g., phone calls, text/chat sessions, web app interactions, etc.), to determine the correlations between the parties of concurrent/recent communication sessions and the selected recipients for sharing content objects.

In some embodiments, the sharing routine 210 and/or suggestion engine 240 might not be configured to provide separate sets of application and recipient suggestion, but instead may provide a set of combined person-application suggestions. To illustrate, within a particular interaction data set for content sharing, the most common application for sharing may be an email application, and the most common recipient may be "Joe," but it also may be true that no content has ever been shared with Joe via email. Thus, it may be advantageous to train and execute models similar to those discussed above in step 601-605, but where the model optimize suggestions for discrete recipient-application combinations, rather than separating the suggestion processes for recipients and applications.

To further update or optimize suggestions of recipient-application combinations, in some cases the suggestion engine 240 or sharing routine 210 may discover that particular applications are or are not present on the devices of particular recipients. For example, if a suggested recipient "Sue" does not appear to have the application "Social Media App #1" on her device 100, than that recipient-application combination may be excluded from the suggestions. The exclusion may occur automatically during the execution of the models in steps 603-604, or may be performed after receiving the suggestions from the models, as a way of filtering and improving the results. In some embodiments, the sharing routine 210 or suggestion engine 240 may maintain a data store identifying which applications are and are not installed on the remote devices of different recipients. This information may be learned based on previous sharing of content objects via particular applications, the previous receiving of shared content objects from that recipient via particular applications, and/or by analyzing data collected by local applications (e.g., native or third-party applications) identifying application-specific interactions with the recipient (e.g., social media application messaging sessions, etc.).

VII. Sharing User Interface Presented to User

After receiving sets of suggested applications and/or suggested recipients from the suggestion engine 240, for sharing the content object, the sharing routine 210 may provide a user interface to display the suggested applications and recipients, and to receive the user's selections of a particular application and/or recipient for sharing the content object.

Figures 7A, 7B:
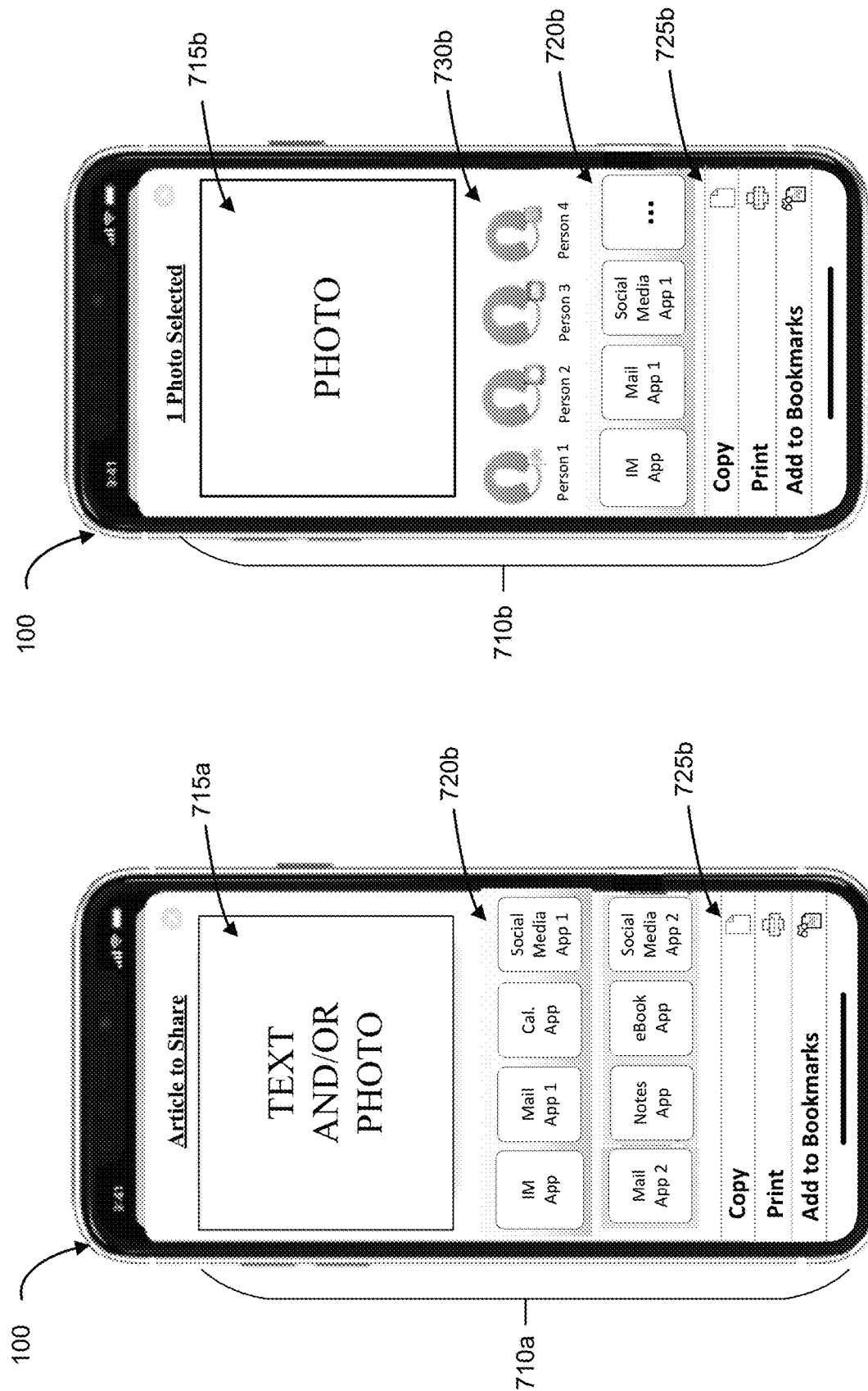
FIGS. 7A and 7B show a mobile device with user interfaces displaying suggested applications and suggested application/recipients pairs according to embodiments of the present disclosure.

In some embodiments, the sharing routine 210 may provide a user interface (e.g., in step 506) to present one or more application suggestions and/or recipient suggestions that may be selected by the user for sharing the content object. The user interface provided by the sharing routine may display a set of selectable components corresponding to the one or more suggested applications, and/or a set of selectable components corresponding to the one or more suggested recipients. Two examples of illustrative user interface screens are shown in FIGS. 7A and 7B. In each of these examples, a mobile device 100 is shown executing a host application and sharing routine, with a sharing routine user interface window 710a or 710b overlaying and obscuring the host application window. The display of the sharing user interface 710a and 710b indicates that the user of the mobile device 100 has selected an article 715a in FIG. 7A and an image 715b in FIG. 7B, from within the host application to be shared with one or more other applications, users, or devices. Thus, in these examples, the host application displayed underneath the sharing user interface may be any number of possible applications, such as photograph library applications, Internet browser applications, social media applications, etc. As noted above, the host application may provide a dedicated button, icon, or menu option to initiate the sharing user interfaces 710a-b for whichever objects are currently selected within the user interface of the host application.

When the sharing routine 210 is initiated by the host application 205, the sharing user interfaces 710a-b may display the content objects to be shared 715a-b, user-selectable lists of possible applications 720a-b that may be used to share the content object, and a list of additional capabilities 725a-b corresponding to other functions supported by the device 100 for the content object (e.g., copy, print, add to bookmarks). Additionally, as shown in FIG. 7B, the sharing user interface window 710b also may include a user-selectable list of suggested recipients 730b for sharing the content object. In this example, the user-selectable list of suggested recipients 730b includes recipient-application combinations. In both FIGS. 7A and 7B, each icon or image in the applications lists 720a-b and the recipients list 730b may correspond to a selectable component.

Although individual user faces are not shown in the example interface of FIG. 7B, in certain embodiments the sharing routine 210 may be configured to look-up each of the received recipients in one or more data sources (e.g., the user's contacts list, phone book, social media contacts list, etc.) and may retrieve additional data such as an image of the recipient, nickname, or other personal data, which then may be incorporated in the recipient suggestion list 730b of the sharing user interface 710b.

The sharing routine 210 then may receive user selections (e.g., in step 507) of one or more applications to be used for sharing the content object, and/or one or more recipients with whom the content object is to be shared. Referring again to the example sharing user interface windows 710a-b in FIGS. 7A and 7B, the user may select one of the specified applications in application lists 720a-b with which to share the content object (in FIG. 7A or 7B), or may select the ellipsis (in FIG. 7B) to view and select additional applications. Additionally, in FIG. 7B, the user may select one of the specified recipient-application combinations 730b.

It should be understood that the suggested sets of applications 720a-b, and the suggested recipient-application combinations 730b, may correspond to the suggestions determined by the suggestion engine 240 using the techniques discussed above in reference to FIG. 6, and returned to the sharing routine 210. The suggestions may include likelihood (probability) values that specify how the suggestions should be ordered (e.g., for each of the two lists). Alternatively, the suggestions can be sent in the order that they are to be displayed. In some embodiments, the sharing routine 210 may rank, filter, and/or customize the suggestion results received from the suggestion engine 240, prior to displaying them via the sharing user interface. For example, after receiving back the application and/or recipient suggestions, the sharing routine may filter out any suggested applications that have recently been removed from the device or filter out applications that are not supported for sending a selected content object. The sharing routine 210 also may rank or customize the suggested applications and recipients based on the preferences/configurations of the device, user preferences, host application, and/or target application (i.e., the application used to share the content object). In some cases, the sharing routine 210 also may enforce a maximum number of suggestions for applications and/or recipients. For instance, the total number of application suggestions or recipient suggestions may be limited by the form factor of the device 100, by user preferences, etc. Additionally, in some embodiments, users, host applications, and/or target applications may provide preferences for particular content objects, particular recipients, particular counterpart applications, including preference rankings and/or blacklists which may override the suggestions from the suggestion engine 240 to prevent display of a particular recipient and/or application, based on the user, content type, host application, and/or other context data.

In another example, the sharing routine 210 may implement a technique for promoting newly installed target applications on the device 100. For instance, even though a new application recently installed on the device 100 is unlikely to be suggested by the modeling of the suggestion engine 240, due to a lack of previous interaction data, the sharing routine 210 may override the suggestions to include the new application in the suggested application lists 720a-b as a way of encouraging the user to try the newly installed application. For example, the sharing routine 210 may determine the installation dates of various applications on the device, and compare these dates to a recency threshold (e.g., 1 week, 1 month, etc.) whereby any applications installed no the device 100 more recently than the threshold may be included in the suggestion list, in order to encourage the user to interact with the newly installed applications.

VIII. Invoking and Prepopulating the Application for Sharing

Finally, after the user selects an application with which to share the content object, the sharing routine 210 may invoke the selected (target) application and provide the invoked application with the content object to be shared (e.g., in step 508). For example, within the sharing user interfaces of FIGS. 7A and 7B, if the user selects the "Mail App 1" button within either sharing user interface window 710a-b, the default email application installed on the device 100 may be invoked, a newly composed email may be opened, and the content object (i.e., article or image) may be automatically attached to or embedded in the newly composed email. Similarly, if the user selects the "IM App" button within the sharing window 710a-b, the specified messaging application on the device 100 may be opened, and a new message may be created with the content object (i.e., article or image) embedded within the message content. If the user selects the "Social Media App 1" button within the sharing window 710a-b, the selected social media application may be opened on the device 100, and a new social media post may be created including the content object (i.e., article or image).

Although the suggested recipient list shown in FIG. 7B is a list of particular recipient-application combinations, in other examples a sharing user interface may include a list of suggested recipients without associated applications. In such examples, the user may select one or more recipients from the recipient list within the sharing window, and in response the sharing routine may prompt the user to then select an application for sharing the content object with the selected recipient(s).

In some embodiments, after receiving a selection of an application and recipient for sharing the content object, the selected application may be invoked and prepopulated automatically by the sharing routine 210 with customized data. For example, an email or message subject, headers, or body may be prepopulated with a greeting or other customized content which is specific to user, host application, and/or content type. For instance, a recipient address can be prepopulated within the first suggested application, based on the at least one potential recipient associated with the first suggested application

IX. Hardware Overview

Figure 8:
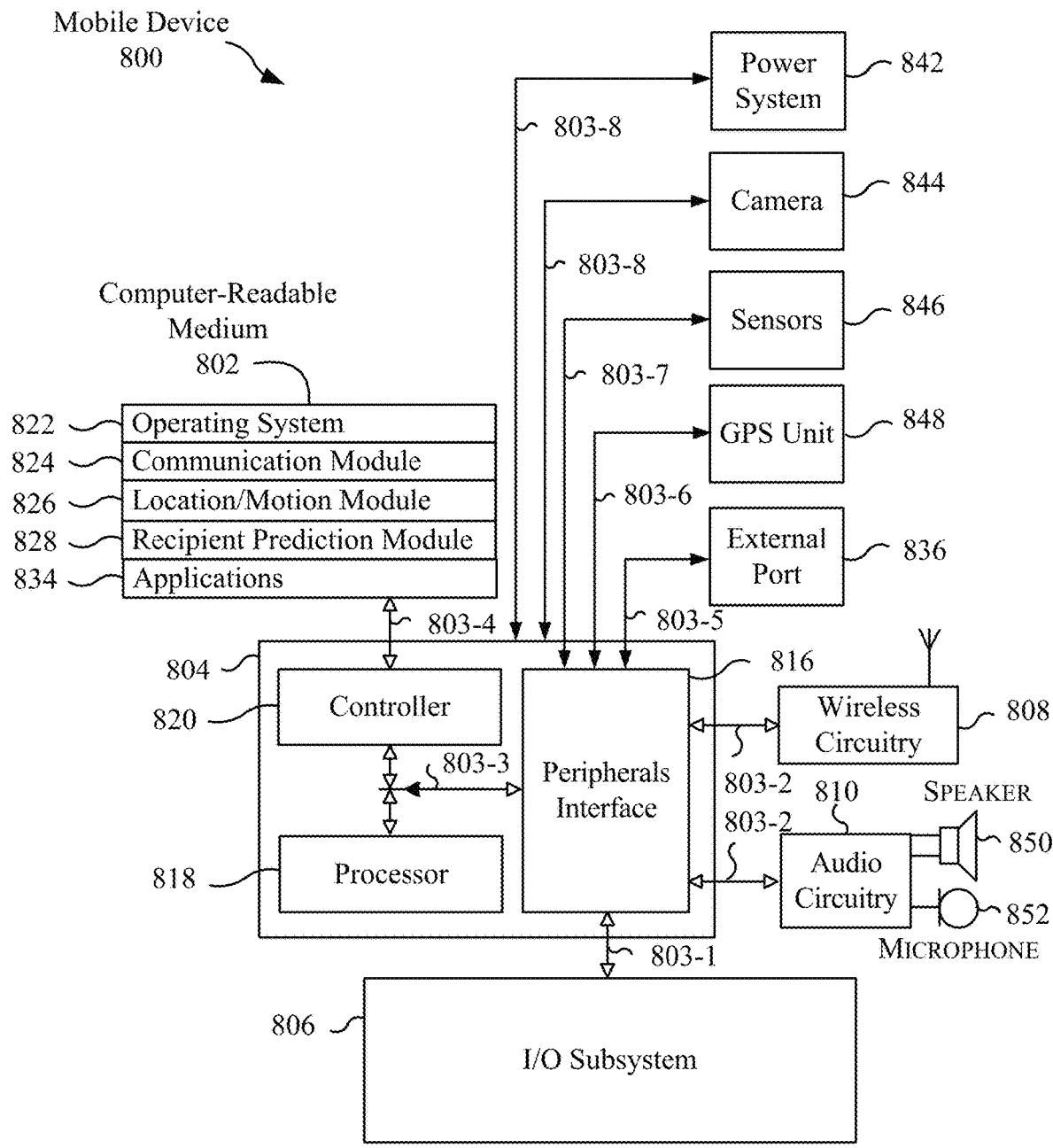
FIG. 8 is a block diagram of an example device according to aspects of the present disclosure.

FIG. 8 is a block diagram of an example electronic device 800. Device 800 generally includes computer-readable medium 802, a processing system 804, an Input/Output (I/O) subsystem 806, wireless circuitry 808, and audio circuitry 810 including speaker 812 and microphone 814. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a headset, or the like, including a combination of two or more of these items.

It should be apparent that the architecture shown in FIG. 8 is only one example of an architecture for device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 808 can use various protocols, e.g., as described herein. In various embodiments, wireless circuitry 808 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 808 is coupled to processing system 804 via peripherals interface 816. Peripherals interface 816 can include conventional components for establishing and maintaining communication between peripherals and processing system 804. Voice and data information received by wireless circuitry 808 (e.g., in speech recognition or voice command applications) is sent to a processing unit having one or more processors 818 via peripherals interface 816. One or more processors 818 are configurable to process various data formats for one or more application programs 834 stored on medium 802.

Peripherals interface 816 couple the input and output peripherals of device 800 to the one or more processors 818 and computer-readable medium 802. One or more processors 818 communicate with computer-readable medium 802 via a controller 820. Computer-readable medium 802 can be any device or medium that can store code and/or data for use by one or more processors 818. Computer-readable medium 802 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 816, one or more processors 818, and controller 820 can be implemented on a single chip, such as processing system 804. In some other embodiments, they can be implemented on separate chips.

Processor(s) 818 can include hardware and/or software elements that perform one or more processing functions, such as mathematical operations, logical operations, data manipulation operations, data transfer operations, controlling the reception of user input, controlling output of information to users, or the like. Processor(s) 818 can be embodied as one or more hardware processors, microprocessors, microcontrollers, field programmable gate arrays (FPGAs), application-specified integrated circuits (ASICs), or the like.

Device 800 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 800 includes a camera 844. In some embodiments, device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module 824 (or set of instructions), a location module 826 (or set of instructions), a settings module 828 that is used as part of determining settings (e.g., a playback buffer size) described herein, and other application programs 834 (or set of instructions).

Operating system 822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (e.g., USB, FireWire, Lightning connector, 60-pin connector, etc.) is adapted for coupling directly to other devices or indirectly over a network (e.g., the Internet, wireless LAN, etc.).

Location/motion module 826 can assist in determining the current position (e.g., coordinates or other geographic location identifiers) and motion of device 1300. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 800 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data A settings module 828 can determine settings of mobile device 800 and/or of other devices (e.g., a playback device) in communication with device 800. For example, settings module 828 can determine a buffer size of a playback (jitter) buffer of a playback device. Settings module 828 can make the determination based on information obtained from other components of device 800, e.g., from wireless circuitry 808, which may correspond to a wireless interface. Settings module 828 can communicate with various application programs 834, e.g., ones that provide streaming content. For example, settings module 828 can cause a change in a rate that streamlining content is provide from an application. In some embodiments, settings module 828 can also include a timing module or cause a timing module to provide a sped up or slowed down clock signal to a streaming application.

The one or more applications 834 on device 800 can include any applications installed on the device 800, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or trackpad. In some embodiments, I/O subsystem 806 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 806 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art Further, as described above, one aspect of the present technology is the gathering and use of data available from various sources to improve suggestions of applications and/ or people to share content from a host application. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine application and people suggestions for sharing content that is of greater interest to the user. Accordingly, use of such personal information data enables users to more efficiently control sharing of content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing of content objects, the present technology can be configured to allow users to select to "opt in" or "opt out" of participation in the collection of personal information data during registration for services or anytime thereafter. In another example, users may select not to provide data corresponding to their previous interactions with various applications, along with their sharing preferences and/or historical user interactions. In yet another example, users can select to limit the length of time that previous application interactions and sharing data is maintained or entirely prohibit the collection and tracking of such data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suggestions for sharing applications and people may be selected and provided to users based on non-personal information data or a bare minimum amount of personal information, such as the content being requested by the device associated with a user, other non-personal information available to the content sharing systems, or publicly available information.

What is claimed is:

1. A method of invoking an application to share a content object, the method comprising performing, by a computing device:

while a host application is executing on the computing device and displayed within a window of the computing device, receiving, at an input device of the computing device, a user request to share a content object associated with the host application, the host application having a host identifier;

responsive to the user request, invoking a sharing routine executing on the computing device;

determining, by the sharing routine, a content type of the content object to be shared;

sending, by the sharing routine, the host identifier and the content type to a suggestion engine executing on the computing device;

accessing, by the suggestion engine, a model trained using historical user interactions with a plurality of applications installed on the computing device, each of the historical user interactions including one of a plurality of content types shared in the historical user interaction with a recipient;

receiving, by the suggestion engine, current context data associated with the computing device;

determining, by the suggestion engine, one or more suggested applications for sharing the content object using the model, the current context data, and the host identifier;

providing a user interface of the sharing routine configured to display one or more selectable components corresponding to the one or more suggested applications for sharing the content object, wherein the one or more selectable components excludes any application installed on the computing device that does not support the content type;

receiving via the user interface, a selection of a first selectable component corresponding to a first suggested application for sharing the content object; and in response to the selection of the first selectable component corresponding to a first suggested application:
invoking, by the computing device, the first suggested application; and
providing, to the first suggested application, data identifying the content object to be shared.

2. The method of claim 1, further comprising:
determining, by the sharing routine, a list of one or more supported applications installed on the computing device that support the content type;
transmitting, by the sharing routine, data corresponding the list of supported applications, to the suggestion engine.

3. The method of claim 1, further comprising:
retrieving, by the sharing routine, a plurality of context data from one or more data sources, in response to the user request;
selecting, by the sharing routine, the current context data from the plurality of context data, based on one or more of the user, the host application, or content type; and
transmitting, by the sharing routine, the current context data to the suggestion engine.

4. The method of claim 1, further comprising:
determining, by the sharing routine, one or more metadata fields of the content object; and
transmitting, by the sharing routine, the one or more metadata fields to the suggestion engine,
wherein the historical user interactions used to train the model include data identifying the content type and one or more metadata fields of the content objects associated with the historical user interactions.

5. The method of claim 4, wherein the determined content type of the content object to be shared corresponds to a digital image or video, and wherein the one or more metadata fields transmitted from the sharing routine to the suggestion engine comprises data identifying at least one person or object pictured within the content object.

6. The method of claim 1, further comprising:
determining, by the suggestion engine, at least one potential recipient associated with each of the one or more suggested applications; and
displaying, by the sharing routine and via the user interface, additional data in relation to each of the one or more selectable components, the additional data identifying the at least one potential recipient determined for the corresponding suggested application,
wherein the received selection of the first selectable component corresponds to a combination of the first suggested application and the at least one potential recipient associated with the first suggested application.

7. The method of claim 6, further comprising:
prepopulating a recipient address within the first suggested application, based on the at least one potential recipient associated with the first suggested application.

8. The method of claim 1, wherein the current context data received by the suggestion engine comprises at least one of: a time of the user request to share the content object, a location of the computing device at the time of the user request to share the content object, or at least one other computing device detected within a proximity of the computing device at the time of the user request to share the content object.

9. A non-transitory computer-readable storage medium storing computer-executable instructions that, when executed by one or more processors of a computing device, cause the one or more processors to:
while a host application is executing on the computing device and displayed within a window of the computing device, receive, at an input device of the computing device, a user request to share a content object associated with the host application, the host application having a host identifier;
invoke a sharing routine executing on the computing device, responsive to the user request;
determine, by the sharing routine, a content type of the content object to be shared;
send, by the sharing routine, the host identifier and the content type to a suggestion engine executing on the computing device;
access, by the suggestion engine, a model trained using historical user interactions with a plurality of applications installed on the computing device, each of the historical user interactions including one of a plurality of content types shared in the historical user interaction with a recipient;
receive, by the suggestion engine, current context data associated with the computing device;
determine, by the suggestion engine, one or more suggested applications for sharing the content object using the model, the current context data, and the host identifier;
provide a user interface of the sharing routine configured to display one or more selectable components corresponding to the one or more suggested applications for sharing the content object, wherein the one or more selectable components excludes any application installed on the computing device that does not support the content type;
receive via the user interface, a selection of a first selectable component corresponding to a first suggested application for sharing the content object; and
in response to the selection of the first selectable component corresponding to a first suggested application:
invoke the first suggested application; and
provide, to the first suggested application, data identifying the content object to be shared.

10. The computer-readable storage medium of claim 9, the computer-executable instructions further causing the one or more processors to:

determine, by the sharing routine, a list of one or more supported applications installed on the computing device that support the content type;

transmit, by the sharing routine, data corresponding the list of supported applications, to the suggestion engine.

11. The computer-readable storage medium of claim 9, the computer-executable instructions further causing the one or more processors to:

retrieve, by the sharing routine, a plurality of context data from one or more data sources, in response to the user request;

select, by the sharing routine, the current context data from the plurality of context data, based on one or more of the user, the host application, or content type; and transmit, by the sharing routine, the current context data to the suggestion engine.

12. The computer-readable storage medium of claim 9, the computer-executable instructions further causing the one or more processors to:

determine, by the sharing routine, one or more metadata fields of the content object; and transmit, by the sharing routine, the one or more metadata fields to the suggestion engine, wherein the historical user interactions used to train the model include data identifying the content type and one or more metadata fields of the content objects associated with the historical user interactions.

13. The computer-readable storage medium of claim 12, wherein the determined content type of the content object to be shared corresponds to a digital image or video, and wherein the one or more metadata fields transmitted from the sharing routine to the suggestion engine comprises data identifying at least one person or object pictured within the content object.

14. The computer-readable storage medium of claim 9, the computer-executable instructions further causing the one or more processors to:

determine, by the suggestion engine, at least one potential recipient associated with each of the one or more suggested applications; and display, by the sharing routine and via the user interface, additional data in relation to each of the one or more selectable components, the additional data identifying the at least one potential recipient determined for the corresponding suggested application, wherein the received selection of the first selectable component corresponds to a combination of the first suggested application and the at least one potential recipient associated with the first suggested application.

15. The computer-readable storage medium of claim 14, the computer-executable instructions further causing the one or more processors to:

prepopulate a recipient address within the first suggested application, based on the at least one potential recipient associated with the first suggested application.

16. The computer-readable storage medium of claim 9, wherein the current context data received by the suggestion engine comprises at least one of: a time of the user request to share the content object, a location of the computing device at the time of the user request to share the content object, or at least one other computing device detected within a proximity of the computing device at the time of the user request to share the content object.

17. A computing device, comprising:

a processing unit comprising one or more processors;

memory coupled with and readable by the processing unit and storing therein a set of instructions which, when executed by the processing unit, causes the computing device to:

while a host application is executing on the computing device and displayed within a window of the computing device, receive, at an input device of the computing device, a user request to share a content object associated with the host application, the host application having a host identifier;

invoke a sharing routine executing on the computing device, responsive to the user request;

determine, by the sharing routine, a content type of the content object to be shared;

send, by the sharing routine, the host identifier and the content type to a suggestion engine executing on the computing device;

access, by the suggestion engine, a model trained using historical user interactions with a plurality of applications installed on the computing device, each of the historical user interactions including one of a plurality of content types shared in the historical user interaction with a recipient;

receive, by the suggestion engine, current context data associated with the computing device;

determine, by the suggestion engine, one or more suggested applications for sharing the content object using the model, the current context data, and the host identifier;

provide a user interface of the sharing routine configured to display one or more selectable components corresponding to the one or more suggested applications for sharing the content object, wherein the one or more selectable components excludes any application installed on the computing device that does not support the content type;

receive via the user interface, a selection of a first selectable component corresponding to a first suggested application for sharing the content object; and in response to the selection of the first selectable component corresponding to a first suggested application:

invoke the first suggested application; and provide, to the first suggested application, data identifying the content object to be shared.

18. The computing device of claim 17, the memory storing additional instructions which, when executed by the processing unit, further causes the computing device to:

determine, by the sharing routine, a list of one or more supported applications installed on the computing device that support the content type;

transmit, by the sharing routine, data corresponding the list of supported applications, to the suggestion engine.

19. The computing device of claim 17, the memory storing additional instructions which, when executed by the processing unit, further causes the computing device to:

retrieve, by the sharing routine, a plurality of context data from one or more data sources, in response to the user request;

select, by the sharing routine, the current context data from the plurality of context data, based on one or more of the user, the host application, or content type; and transmit, by the sharing routine, the current context data to the suggestion engine.

20. The computing device of claim 17, the memory storing additional instructions which, when executed by the processing unit, further causes the computing device to:
- determine, by the sharing routine, one or more metadata fields of the content object; and
- transmit, by the sharing routine, the one or more metadata fields to the suggestion engine,
- wherein the historical user interactions used to train the model include data identifying the content type and one or more metadata fields of the content objects associated with the historical user interactions.

\* \* \* \* \*